United States Patent [19]

Blake et al.

[11] 4,368,211

[45] Jan. 11, 1983

[54] COMPOSITION FOR AERATED FROZEN DESSERTS CONTAINING UNCOOKED FRUIT PUREE AND METHOD OF PREPARATION

[75] Inventors: Jon R. Blake, Brooklyn Center; Richard K. Knutson, Corcoran, both of Minn.; Deon L. Strommer, Powell Butte, Oreg.

[73] Assignee: General Mills, Inc., Minneapolis, Minn.

[21] Appl. No.: 323,842

[22] Filed: Nov. 23, 1981

[51] Int. Cl.³ .............................................. A23G 9/02
[52] U.S. Cl. ................................. 426/564; 426/565; 426/567
[58] Field of Search ............... 426/565, 567, 616, 639, 426/564, 566

[56] References Cited

U.S. PATENT DOCUMENTS

| | | | |
|---|---|---|---|
| 2,002,963 | 5/1935 | Schade | 426/565 |
| 2,131,650 | 9/1938 | Webb | 426/564 |
| 2,578,915 | 12/1951 | Bartels | 426/565 |
| 2,651,575 | 9/1953 | Talburt et al. | 426/565 |
| 3,236,658 | 2/1966 | Little | 426/658 |
| 3,525,624 | 8/1970 | Rubenstein . | |
| 3,671,268 | 6/1972 | Blake et al. | 426/567 |
| 3,770,461 | 11/1973 | Stewart et al. | 426/517 |
| 3,956,519 | 5/1976 | Evans et al. | 426/519 |
| 4,021,583 | 5/1977 | Arden | 426/565 |
| 4,143,172 | 3/1979 | Mitchell et al. . | |
| 4,146,652 | 3/1979 | Kahn et al. . | |
| 4,232,049 | 11/1980 | Blake | 426/572 |
| 4,232,053 | 11/1980 | Blake . | |
| 4,244,977 | 1/1981 | Kahn et al. | 426/565 |
| 4,244,981 | 1/1981 | Blake | 426/567 |
| 4,282,262 | 8/1981 | Blake | 426/565 |
| 4,293,580 | 10/1981 | Rubenstein . | |

OTHER PUBLICATIONS

21 CFR 135.140.

*Primary Examiner*—Jeanette M. Hunter
*Attorney, Agent, or Firm*—Gene O. Enockson; John A. O'Toole

[57] ABSTRACT

Disclosed are non-dairy dessert compositions suitable for the preparation of soft serve aerated frozen desserts. The compositions comprise from about 25% by weight to about 75% of a whole comminuted fruit puree, from about 0.3% to 1.5% by weight of an acid-stable whipping agent, from about 0.1% to 0.5% by weight of an acid-stable polysaccharide gum, from about 1% to about 15% of a malto dextrin bodying agent, from about 12% to about 28% of a nutritive carbohydrate sweetening agent, and from about 1% to 10% of an edible fatty triglyceride oil. The moisture content of the dessert compositions ranges between about 45% to 75%. After homogenization of the dessert compositions, an aerated frozen, soft serve dessert having a density of 0.2 to 0.95 g./cc. can be prepared in conventional aerated frozen dessert equipment.

14 Claims, No Drawings

COMPOSITION FOR AERATED FROZEN DESSERTS CONTAINING UNCOOKED FRUIT PUREE AND METHOD OF PREPARATION

BACKGROUND OF THE INVENTION

1. Field of the Invention

The present invention relates to food compositions and to their methods of preparation. More particularly, the present invention in its product aspect relates to dessert compositions for aerated frozen desserts containing comminuted whole fruit. In its method aspect, the present invention relates to a method of preparing a dessert composition.

2. The Prior Art

A wide variety of dessert compositions are known from which frozen desserts can be prepared. Such compositions can be divided into dairy-based compositions (e.g., ice cream, some sherbets, etc.) and non-dairy based compositions (e.g., fruit ices). Non-dairy based frozen desserts are characterized in part by an absence of any milk-derived components including milk or butterfat, non-fat milk solids or sugars or even milk derived proteins such as whey solids or caseinate. Such compositions are particularly useful for consumption by individuals having lactose intollerancy. Non-dairy frozen desserts can be further divided into non-aerated compositions such as popsicles, on the one hand and aerated or aerable compositions, on the other. The present invention relates to aerated frozen non-dairy dessert compositions.

In the aerated frozen dessert art, a further distinction is made between "regular" aerated frozen desserts such as ice cream and sherbets which are intended for consumption upon removal from extended frozen storage and "soft serve" dessert, e.g., Dairy Queen ®, which are intended to be consumed immediately upon preparation. While desirably soft upon aeration and freezing, soft serve aerated frozen desserts undesirably develop large ice crystals upon extended frozen storage compared to regular aerated frozen desserts. Moreover, at equal serving temperatures, soft serve frozen desserts which have been stored at freezer temperatures are much harder than regular ice creams or sherbets.

Among the many physical property differences between regular and soft serve aerated frozen desserts are intended serving temperature, percentage of moisture which is frozen, and hardness at serving temperature. As a result, dessert compositions formulated to be suitable for regular aerated frozen products are often unsuitable for use as soft serve products due to differences in composition. These compositional differences include moisture content, fat content, and sugar to fat ratios. The present invention relates to compositions, however, which broadly are suitable for soft serve and regular frozen desserts.

Art-known non-diary dessert compositions for the preparation of aerated frozen desserts include those disclosed in U.S. Patent Application Ser. No. 44,798, filed May 31, 1979 to J. R. Blake (see also Ser. No. 43,993, filed May 31, 1979 to J. R. Blake and which is incorporated herein by reference). These compositions are also useful for both regular and soft serve dessert embodiments. These compositions comprise a specially prepared cooked comestible base as well as several other components such as stabilizer gums, edible fatty triglycerides and whipping agents. The comestible base is taught as essentially comprising citrus juice vesicles, ungelatinized starch, water-soluble pectin, an edible non-volatile organic acid and a nutritive carbohydrate sweetening agent. These compositions can be used for the at-home preparation of aerated frozen desserts by static freezing after aeration as well as by commercial preparation. Another advantage provided by these known dessert compositions is "heat shock" stability.

The present invention is an improvement in these known dessert compositions. The improvement resides, in part, in the surprising discovery that ingredients previously recognized as essential can be eliminated without substantial loss of the benefits of such prior compositions in the preparation of soft serve desserts. The improvement resides also in part in the further surprising discovery that other, whole fruit materials can be used in substitution for the previously recognized as essential component of citrus juice vesicle solids.

In its method aspect, the present invention resides, in part, in the surprising discovery that the cooking step previously recognized as essential can be eliminated if the entire composition is homogenized in a prescribed manner prior to aeration and freezing. An additional benefit derived from the elimination of the cooking step is an improvement in the flavor.

Another benefit provided by certain embodiments of the present compositions are aerated frozen, fruit based desserts containing only "natural" ingredients, i.e., free from added emulsifiers, artificial flavors, colors, citrus waste products, preservatives and the like.

SUMMARY OF THE INVENTION

The present invention relates to dessert compositions containing whole fruit puree suitable for the commercial preparation of aerated soft serve frozen desserts.

The dessert compositions essentially comprise from about 25% by weight to about 75% of a fruit puree, from about 12% to 28% of a nutritive carbohydrate sweetening agent, from about 0.3% to 1.5% of an acid-stable whipping agent, from about 0.1% to 0.5% by weight of an acid-stable polysaccharide gum, from about 1% to 15% of a malto dextrin bodying agent and from about 1% to 10% of an edible fatty triglyceride oil. The moisture content of the dessert compositions ranges between about 45% to 75%. After admixing the essential and optional ingredients, the composition is essentially homogenized at from 2,000 psi to 4,000 psi.

Thereafter, an aerated frozen dessert having a density of 0.2 to 0.95 g./cc. can be prepared from the present dessert compositions in conventional aerated frozen dessert equipment by agitated freezing at a temperature ranging from about 16° F. to 18° F. If desired, however, an aerated frozen dessert suitable for use as a soft serve frozen dessert can be prepared by freezing in a conventional apparatus at about 22° F.

Throughout the specification and claims, percentages and ratios are by weight and temperatures are given in degrees Fahrenheit, unless otherwise indicated.

DETAILED DESCRIPTION OF THE INVENTION

The present invention relates to dessert compositions containing whole comminuted fruit for the preparation of aerated frozen desserts. The present desserts are useful in the preparation of soft serve, non-diary desserts characteristic of the fast food trade as well as for the bulk production of regular frozen desserts.

The present dessert compositions consist essentially of: (A) a fruit puree, (B) a nutritive carbohydrate sweetening agent, (C) a malto dextrin bodying agent, (D) an acid-stable whipping agent, (E) an acid-stable polysaccharide gum, (F) an edible fatty triglyceride, and (G) moisture. Each of these frozen dessert composition ingredients as well as product preparation and product use as described in detail below.

A. FRUIT PUREE

Fruit puree is the principal component of the present food compositions. Surprisingly, it has been discovered that frozen, aerated dessert compositions can be prepared employing whole fruit puree(s) in total substitution for selected citrus fruit constituents of known non-dairy dessert compositions.

The term "puree" has been used in the art to refer to both heat treated, e.g., boiled, and untreated food pulp. As used herein, however, "puree" is meant to refer only to unheat-treated whole fruit pieces which have been mechanically transformed into fluids. After homogenization, the modified-by-homogenization fruit puree(s) provide the structuring to the present frozen desserts. Moreover, the modified fruit puree(s) additionally serve to bind the present essential fatty triglyceride ingredient without requiring the utilization of conventional emulsifiers. Of course, the fruit ingredient provides characteristic fruit flavor and color.

Surprisingly, puree(s) made from any fruit can be used herein. Examples of such fruits include pineapple, lemon, orange, peach, pear, grape, mango, apple, tomato, banana, plum, blueberry, raspberry, strawberry, blackberry, current, cherry, and mixtures thereof. Fresh fruit is, of course, highly preferred for preparing puree(s) for use herein. However, previously frozen fruit is also suitable for use herein.

Fruit puree(s) as defined herein, of course, are well known and the skilled artisan will have no problem preparing puree(s) from suitable fruit(s). Generally, fruit puree(s) are prepared by simply comminuting whole fruit in known equipment. For those fruits containing small seeds, e.g., grapes, strawberries, blackberries, as opposed to peaches, plums or apples, a post comminuting, deseeding step may be necessary to provide the desirable seedless fruit puree(s) useful herein. Typically, either manual or mechanical deseeding involves screening the comminuted fruit to separate the seeds from the fruit puree.

It is essential to employ fruit puree(s) of reduced particle size to form a smooth puree. Suitable puree size reducing equipment and techniques include, for example, homogenizers, commitrols, or even deseeders. Homogenization is the preferred size reduction technique for use herein.

Homogenized fruit puree(s) can be prepared using conventional homogenization methods and apparatus. Generally, homogenizers are divided into two groups according to the kind of energy introduced into the medium homogenized: (1) rotor or rotor-stator systems, e.g., agitators, emulsifying pumps and colloid mills, and (2) pressure systems, e.g., wedge resonators and pressure homogenizers. The pressure homogenizers are predominantly used in food processing since they have the best homogenizing effects. Preferably, such units which are used in the preparation of the homogenized fruit puree(s) usefully employed in the present dessert compositions are those homogenizers which are constructed to prevent contamination. Typically, fruit puree(s) are easily homogenized employing wide ranges of homogenization pressures, e.g., 1,000 to 8,000 p.s.i.g. One or more homogenization steps at the same or different pressures can be employed.

Unfortunately, homogenized fruit puree(s) is not readily amenable to analysis of their particle size distributions due to the solids constituents of the puree being partially dissolved/suspended in nature and due to the high viscosity of the puree. Sufficient homogenization for the present invention is achieved, however, when the homogenized fruit purees' taste perception is particle free or homogeneous, e.g., similar texturally to catsup.

The size reduced fruit puree(s) is present in the present compositions in amounts of from about 25% to 75% (wet basis). Superior results in terms of structuring ability and flavor, for example, are achieved when the fruit puree(s) is present at from about 25% to 45%. Best results are obtained when the puree(s) is present at from about 25% to 40% of the present compositions.

Fruit puree generally contains about 75% to 90% moisture. Thus, when only the solid materials provided by the fruit puree is considered, the fruit puree solids comprise from about 2% to 20% of the present fruit composition. Preferably about 6.5% to 8.8% and most preferably from about 7% to about 8.1%.

B. SWEETENING AGENT

A nutritive carbohydrate sweetening agent is an essential component herein and is present in the present food compositions at from about 12% to 28%, preferably from about 15% to 20%. The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharin, cyclamate and the like. Additionally, the present carbohydrate sweetening agents are to be distinguished from such protein-based sweetening agents as aspartame, thaumatin and monellin.

Suitable materials for use as nutritive carbohydrate sweetening agents are well known in the art. Examples of sweetening agents include both monosaccharide and disaccharide sugars such as sucrose, invert sugar, dextrose, lactose, honey, maltose, fructose, maple syrup and corn syrup or corn syrup solids. Preferred nutritive carbohydrate sweetening agents are those selected from the group consisting of sucrose, glucose, fructose, corn syrup solids and honey. Highly preferred nutritive carbohydrate sweetening agents are those selected from the group consisting of sucrose, corn syrup solids and fructose. Of course, mixtures of the above-noted materials are contemplated herein.

While the above-exemplified sweetening agents are available in highly purified forms, other sources of sweetening agents which are not as highly purified can be used. For example, a relatively inexpensive material such as apple juice powder (or apple powder as it is commercially labeled) which is approximately 70% by weight (dry basis) sugars can be employed as a nutritive sweetening agent. If used, such impure sources of sugars are employed at levels based upon their total sugars' content. Up to 25% of the nutritive carbohydrate sweetening agent used herein can be supplied by such impure sweetening agents.

C. BODYING AGENT

Another essential ingredient of the present dessert compositions is a bodying agent. The present bodying agents serve to both bulk and body and, most importantly, provide additional solids as to enable the realization of dessert compositions having moisture contents within the essential ranges given below. Generally, the bodying component is present at from about 1% by weight to about 15% by weight. Superior results in terms of organoleptic properties are obtained when the bodying component is present in the dessert compositions of the present invention at from about 3% to 10% by weight. For best results, however, the bodying component should be employed at from about 4% to 6% by weight.

It is important in the provision of frozen dessert compositions of organoleptically acceptable sweetness that the bodying agent be bland and provide minimal sweetness. Suitable bodying agents thus include low D.E. malto dextrins, polydextrose and mixtures thereof. By low D.E. is meant a malto dextrin with a D.E. of less than about 20. Low D.E. malto dextrins are commercially available from many suppliers and the skilled artisan will have no difficulty in selecting suitable malto dextrins for use herein. Generally, however, malto dextrins can be obtained by dextrinization of starch, particularly corn starch. Enzymatic hydrolysis, optionally under acidic conditions, of the starch can be used. The conditions are so mild that negligible repolymerization occurs. This is in contrast to dextrins which typically are made from starch by hydrolysis and repolymerization by using high temperature and pressure by dry heating or roasting of starches (pyro-dextrins).

Low D.E. malto dextrin is the preferred material for use as the bodying agent herein.

D. WHIPPING AGENT

The present dessert compositions also essentially contain from about 0.3 to 1.5% of an acid-stable whipping agent. Better results are obtained when the present compositions contain from about 0.4 to 0.8% of the whipping agent. By "acid-stable" it is meant herein that the presently employable whipping agents be able to aerate the present dessert compositions which have a pH ranging from about 2.5 to 5.5 to densities of between about 0.2 to 0.95 g./cc. when the whipping agent is present within the above specified range.

Whipping agents are well known in the food art and selection of suitable materials for use herein as the acid-stable whipping agent also will pose no problem to the skilled artisan. Suitable materials can be derived as protein hydrolyzates from, for example, vegetable proteins. The protein hydrolyzates employed herein are water soluble (i.e., soluble at least to about 20% by weight at 25° C. throughout the pH range of about 2.0 to 10.0). The soy protein hydrolyzates disclosed in U.S. Pat. No. 3,814,816 (issued June 4, 1974 to R. C. Gunther, incorporated herein by reference) are particularly effective whipping proteins. These proteins are commercially available from Staley Mfg. Co., Decatur, Ill., and may be prepared by initially chemically hydrolyzing the soy protein to a prescribed viscosity range and thereafter enzymatically hydrolyzing the soy protein with pepsin to produce a pepsin modified hydrolyzed soy protein whipping agent. Other suitable whipping agents are described in detail in U.S. Pat. No. 3,889,001 (issued June 10, 1975 to Buide et al. and incorporated by reference herein).

E. ACID-STABLE POLYSACCHARIDE GUMS

The present dessert compositions also essentially comprise an acid-stable polysaccharide gum. The term "acid-stable" when used herein with reference to the polysaccharide gums indicates that the viscosity of gum dispersions of specified gum level at specified temperatures are little effected by the pH of the dispersion. More specifically, the term "acid-stable" is used to indicate that aqueous gum dispersions will vary in viscosity less than about 25% throughout the pH of the present food compositions, i.e., between about 2.5 to 5.5 at room temperatures (25° C.).

The physical and chemical properties of edible polysaccharide gums are well known in the food art and selection of specific acid-stable gums will pose no problem to the skilled artisan (see, for example, "Gum Technology in the Food Industry", M. Glicksman, Academic Press, New York, 1969; "Food Colloids", ed. by H. D. Graham, Avi Publishing Co., Westport, Conn., 1977; and "Industrial Gums", R. L. Whistler 2nd ed., Academic Press, New York, 1973; each of which is incorporated herein by reference). Preferred gums for use herein are selected from the group consisting of guar gum, locust bean gum, xanthan gum and mixtures thereof. Best results in terms of mouthfeel, syneresis inhibition and aeration stability are realized when the polysaccharide gum is a mixture of xanthan, locust bean and guar gums. Exemplary gum mixture of this type is sold by Merck & Co. under the name Kelco GFS.

The polysaccharide gums are essentially present in the instant dessert compositions at from about 0.05% to 0.5%, preferably at from about 0.1% to 0.5%. Best results are obtained when the gums are present at from about 0.2% to 0.3%.

Particular gum utilization levels will depend upon the total moisture in the present compositions, the amount and type of fruit used to form the fruit puree, the particular gum(s) employed and the organoleptic properties desired in the present dessert compositions upon aeration. Generally, however, higher gum utilization levels will be employed with higher compositions moisture contents and lower fruit puree levels. Gum levels will also modestly influence the desired density of the aerated frozen dessert. Compositions of the present invention containing higher gum levels will generally provide frozen desserts exhibiting lower, fluffier densities upon aeration.

F. EDIBLE FATTY TRIGLYCERIDE

The present dessert compositions essentially comprise from about 1% to 15%, preferably between about 6% to 10% by weight of the compositions of an edible fatty triglyceride. Maintenance of the edible fatty triglyceride level within the above ranges is important to the provision of frozen desserts having a desirably rich mouthfeel. Further, excessive fatty triglyceride levels can result in frozen desserts which are unspoonable at freezer temperatures (e.g., 0° F.) due to the dominance of the fat phase's physical properties at such temperatures.

Suitable fatty triglycerides can be either fats or oils. Fats useful herein should have melting points less than mouth temperatures, i.e., less than about 98° F. Any fatty triglyceride oil can be used, however, including even winterized oils. Of course, mixtures of fats and oils are contemplated for use herein.

Suitable fats and oils should be bland in taste, i.e., deodorized. Preferred triglyceride oils are additionally light in color, i.e., having a Gardener color scale value of less than four. For those embodiments to be statically frozen by consumer at-home preparation, the present oils preferably are winterized. Winterization is the common oil process whereby higher melting fractions are removed from edible oils to avoid clouding at refrigeration temperatures.

The present edible fatty triglyceride fats and oils can be derived from any of the naturally occurring liquid glyceridic oils such as soybean oil, cottonseed oil, peanut oil, sesame seed oil, and sunflower seed oil. Also suitable are liquid oil fractions obtained from palm oil, tallow, as for example, by graining or directed interesterification, followed by separation of the oil. Other suitable edible oil materials and methods of edible oil preparation are described in detail in Bailey "Industrial Oil and Fat Products", (3rd Ed. 1964) which is incorporated herein by reference. Preferred materials are selected from the group consisting of coconut oil, soybean oil and mixtures thereof. Coconut oil is the fatty triglyceride of choice, particularly partially hardened coconut oil (e.g., 76° F. coconut oil, i.e., coconut oil which has been partially hydrogenated so as to have a melting point of about 76° F.).

G. MOISTURE CONTENT

The total moisture content of the present dessert compositions essentially ranges between about 45% to about 75% by weight, preferably from about 62% to 72%. Typically, much of the water is supplied by the fruit puree component. However, when fruit puree having low final moisture components are employed in the present dessert compositions, additional water must be employed so that the moisture content of the dessert composition is within the above-given essential range.

Surprisingly, it has been discovered that certain ingredients previously recognized as being essential components of a cooked base in the provision of non-dairy compositions for aerated frozen desserts can be eliminated without substantial adverse effects. Thus, for example, the present dessert compositions can be satisfactorily prepared without including in the uncooked fruit base any of the following: ungelatinized starch, a food grade acidulant, water or water-soluble pectin. Moreover, it has been surprisingly discovered that the heretofore art recognized essential cooking step can be eliminated in the preparation of aerated, non-dairy frozen desserts.

H. OPTIONAL INGREDIENTS

The present dessert compositions can optionally contain a variety of additional ingredients suitable for rendering such compositions more organoleptically or aesthetically desirable or more nutritious. Such optional components include, for example, flavors, coloring agents, acidulants, nuts, vitamins, preservatives and the like. If present, such minor optional components should comprise from about 0.1% to 2.5% of the dessert compositions.

One preferred optional ingredient is conventional stabilized fruit for ice cream. Stabilized fruit for ice cream is commonly used in the ice cream industry. Such material comprises fruit pieces which have been sugar treated to remain soft at the typical freezer temperatures at which ice cream is typically stored, e.g., about 8° F. If present, such stabilized fruit can be used at from about 0% to 20% by weight of the present dessert compositions, preferably from about 5% to 10%. Stabilized fruit is desirably added to the present composition after aeration and freezing.

A conventional emulsifier for frozen aerated desserts can be optionally included in the present inventions. A wide variety of emulsifiers can be employed. Among the more suitable are mono- or diglycerides of fatty acids, such as monostearin and dipalmitin; polyoxyethylene, ethers of fatty esters of polyhydric alcohols, such as sorbitan, monostearate, or sorbitan distearate, fatty esters of polyhydric alcohols, such as sorbitan monostearate; mono- and diesters of glycols and fatty acids, such as propylene glycol monostearate and propylene glycol monopalmitate and mixtures thereof. If present, the emulsifier desirably ranges from about 0.05% to 0.5% in the present dessert compositions.

COMPOSITION PREPARATION AND USE

The dessert compositions of the present invention are prepared by first mixing together in any order and by any conventional means the essential and optional ingredients herein. Typically, a pre-blend of dry ingredients is added to a mixing vessel with moderate agitation that has been previously charged with the fruit puree and water. After hydration of the dry ingredients, the edible fatty triglyceride is added to the blend.

In the present method of dessert mix preparation after the ingredients are thoroughly mixed, it is essential that the composition is homogenized. Homogenization is important to disperse the triglyceride component. The essential homogenization step is practiced using conventional equipment, e.g., two stage homogenizers. To achieve the desired stabilization effect as well as dispersion of the present edible fatty triglyceride component, homogenization is desirably practiced at about 2,000 psi to 3,000 psi in the first stage and from about 300 psi to 500 psi in the second stage.

After the ingredients are thoroughly mixed, the composition can be packaged in conventional packaging means such as pouches, tubs, cartons and the like. It is contemplated that the present dessert compositions can be sold unfrozen and unaerated, and packaged in bulk for the fast food or restaurant trade.

Conventional apparatus, e.g., Taylor Freeze Corp. Model 8751, can be used to freeze and aerate the dessert compositions to prepare from the present compositions soft serve forms of frozen desserts. Typically, these units perform the freezing step at about 22° F. while agitating to realize products having a density of about 0.25 to 0.5 g./cc. Of course, other equipment operating at other freezing temperatures can be used to prepare the products of the present invention into other forms of frozen desserts. For example, conventional ice cream aerating and freezing apparatus can be used to freeze at conventional temperatures of 16° F. to 18° F. and aerate the present compositions to prepare frozen desserts having overrun and hardness properties similar to ice cream.

The dessert compositions of the present invention are illustrated by the following examples.

EXAMPLE I

A non-dairy dessert composition of the present invention useful in the commercial preparation of an aerated, soft serve frozen dessert is prepared having the following composition:

| Ingredient | Weight % |
|---|---|
| Strawberry puree (4 + 1) | 33.00 |
| Whipping agent[1] | 0.50 |
| Polysaccharide gum[2] | 0.20 |
| Sucrose | 12.44 |
| Malto dextrin[3] | 3.32 |
| Vegetable oil (soybean)[4] | 5.90 |
| Water | 43.33 |
| High fructose corn syrup (42%)[5] | 1.31 |
| | 100.00% |

[1] A water-soluble soy protein hydrolyzate: Gunther D-100 WA - Manufactured and sold by A. E. Staley Manufacturing Co. (62% protein, 16% carbohydrate, 24% moisture)
[2] "GFS": A composite of guar gum, locust bean gum and xanthan gum, marketed by the Kelco Division of Merck & Co., Inc.
[3] FRODEX 10 - A malto dextrin of 10 D.E., manufactured and sold by the American Maize Products Co.
[4] Durkex 25 - A winterized soybean oil sold by SCM Corp. Durkee Foods Division.
[5] 80% solids.

The total concentration of malto dextrin in the composition is 4.32%. The total sweetening agent level is 21.64%. The total moisture content is about 64.4%.

A strawberry puree is prepared from frozen "4 plus 1" strawberries, i.e. four parts strawberries and one part sucrose (to prevent disruption of cells during frozen storage). The whole strawberries are fed into a Hobart Corp. Vertical Cutter machine which comminutes the strawberries into a puree. The puree is then deseeded by passing it through an FMC Corp. fruit finisher or a Model 6600 pulper-finisher manufactured by Brown International, Inc. The deseeded strawberry puree is then fed into a two-stage homogenizer operating at 2500/500 psi to form a homogenized, deseeded strawberry puree. The puree is then homogenized a second time in a two-stage homogenizer at 5500/500 psi.

Thereafter, the homogenized, deseeded strawberry puree is charged to a kettle equipped with a swept surface agitator. Next, a pre-blend of all the dry ingredients is added to the kettle along with the corn syrup. The strawberry puree is then admixed with the other essential and optional ingredients at low to medium speed for five minutes. Then, the mixture is aerated and frozen in a Taylor Model No. 8751 at 22° F.

The resulting product is an aerated soft frozen dessert which has the texture and appearance of commercial soft serve ice cream and has a density of 0.3 g./cc.

Compositions of similar physical and organoleptic properties are realized when in the Example I dessert compositions the strawberry puree is replaced with an equivalent amount of puree derived from previously frozen cherries, blueberries, raspberries and mixtures thereof.

Compositions of similar physical and organoleptic properties are realized when in the Example I dessert compositions the soybean oil is substituted with an equivalent amount of corn oil, safflower oil, peanut oil, sunflower seed oil or mixtures thereof.

EXAMPLE II

A non-dairy dessert composition of the present invention is prepared having the following composition:

| Ingredient | Weight % |
|---|---|
| Peach puree (15.6% solids) | 37.71 |
| Distilled water | 28.64 |
| Sucrose | 14.71 |
| Malto dextrin (5 D.E.) | 4.41 |
| Whipping agent[1] | 0.70 |
| High fructose corn syrup | 7.49 |
| 92° Coconut oil | 5.90 |
| Guar gum and locust bean gum (1:1) | 0.27 |
| Optionals | |
| Emulsifier (Polysorbate 60) | 0.15 |
| Tetra Sodium Phosphate | 0.02 |
| | 100.00% |

[1] A water-soluble soy protein hydrolyzate: Gunther D-100 WA - Manufactured and sold by A. E. Staley Manufacturing Co. (62% protein, 16% carbohydrate, 24% moisture).

To prepare the composition, a pre-blend of all the dry ingredients except the emulsifier is prepared by simple dry mixing. The emulsifier is melted into the coconut fat by first heating the coconut fat to 100° F. and then adding the emulsifier to the coconut oil with mild agitation continued for five minutes.

The fruit puree is charged to a large kettle equipped with an agitator. The water is then added. Next, the pre-blend of dry ingredients is slowly added and mixed until dissolved typically requiring about five minutes. Thereafter, the high fructose corn syrup is added using a metered pump. The still hot coconut oil and emulsifier are then added and mixed.

The entire mixture is then heated to 110° F. to ensure that the coconut fat remains an oil and the dessert composition is homogenized in a two-stage homogenizer at 2500/500 psi.

Thereafter, the composition is aerated and frozen in commercial ice cream apparatus at 16° F. to 18° F. to a density of about 0.4 g./cc.

EXAMPLE III

A dessert composition is prepared in accordance with the following formulation:

| Amount | Ingredient | Weight % |
|---|---|---|
| 312.4 lbs. | Raspberry fruit puree (13% solids) | 31.24 |
| 337.0 | Distilled water | 33.70 |
| 7.0 | Whipping agent[1] | 0.70 |
| 2.7 | Polysaccharide gums[2] | 0.27 |
| 169.5 | Sucrose | 16.95 |
| 69.0 | Coconut fat (76° F.) | 6.90 |
| 52.0 | High fructose corn syrup (42%) | 5.20 |
| 50.4 | Malto dextrin | 5.04 |
| 1000.0 lbs. | | 100.00% |

[1] A water-soluble soy protein hydrolyzate: Gunther D-100 WA - Manufactured and sold by A. E. Staley Manufacturing Co. (62% protein, 16% carbohydrate, 24% moisture).
[2] "GFS": A composite of guar gum, locust bean gum and xanthan gum marketed by the Kelco Division of Merck & Co., Inc.

The moisture content of the dessert composition is about 62.74%.

The dessert composition is prepared in a manner similar to that described in Example II.

What is claimed is:

1. A non-dairy composition useful in the preparation of an aerated frozen dessert containing whole fruit puree, comprising:

A. from about 25% to 75% by weight of a puree of whole fruit;

B. from about 12% to 28% by weight of a nutritive carbohydrate sweetening agent;

C. sufficient acid-stable whipping agent to enable aeration of the composition to a density ranging from about 0.2 to 0.95 g./cc.;

D. from about 0.05% to 0.5% by weight of an acid-stable polysaccharide gum;

E. from about 1% to 15% of an edible fatty triglyceride;

F. from about 1% to 15% by weight of a malto dextrin bodying agent; and

G. sufficient water to provide the composition with a moisture content of about 45% to 75%.

2. The food composition of claim 1 wherein the whipping agent is present at from about 0.3% to 1.5% by weight.

3. The composition of claim 2 wherein the comminuted fruit puree has a moisture content of between about 75% to 90% by weight.

4. The composition of claim 3 wherein the fruit puree is homogenized.

5. The composition of claim 4 wherein the fruit puree is present at from about 20% to 45% by weight.

6. The composition of claim 5 wherein the fruit puree is present at from about 25% to 40% by weight.

7. The composition of claim 6 wherein the acid stable whipping agent is present at from about 0.4% to 6.8%, the polysaccharide gum is present at from about 0.1% to 0.5%, and the edible fatty triglyceride is present at from about 6% to 10% by weight.

8. The composition of claim 7 wherein the moisture content ranges from about 62% to 72% by weight.

9. The composition of claim 8 wherein the polysaccharide gum is selected from the group consisting of locust bean, guar, xanthan and mixtures thereof.

10. The composition of claim 9 wherein the sweetening agent is present at from about 15% to 20% of the mixture.

11. The composition of claim 10 wherein the malto dextrin is present at from about 4% to 6% by weight.

12. The composition of claim 7 wherein the edible fatty triglyceride is winterized and the moisture content ranges between about 62% to 72% by weight.

13. The composition of claim 9 additionally comprising from about 0.05% to 0.5% by weight of an emulsifier selected from the group consisting of mono- or diglycerides of fatty acids, fatty esters of polyhydric alcohols.

14. A method for preparing a composition useful in the preparation of an aerated frozen dessert, consisting essentially of the steps in sequence of:

A. reducing the particle size of whole fruit pieces to form a smooth fruit puree;

B. mixing to form a blend
  (1) from about 25% to 75% of the fruit puree;
  (2) from about 12% to 28% by weight of a nutritive carbohydrate sweetening agent;
  (3) from about 0.3% to 1.5% by weight of an acid-stable whipping agent;
  (4) from about 0.05% to 0.5% by weight of an acid-stable polysaccharide gum;
  (5) from about 1% to 15% by weight of an edible fatty triglyceride;
  (6) from about 1% to 15% by weight of a malto dextrin bodying agent; and
  (7) sufficient water to provide a moisture content of about 45% to 75% by weight;

C. homogenizing the blend to form a dessert composition.

* * * * *